(No Model.)

G. P. ATCHISON.
COMBINED HARROW AND PULVERIZER.

No. 377,223. Patented Jan. 31, 1888.

WITNESSES:
J. S. McChin
William W. Case

Garret P. Atchison
INVENTOR

By Frank D. Thomason
his ATTORNEY

UNITED STATES PATENT OFFICE.

GARRET P. ATCHISON, OF CHICAGO, ILLINOIS.

COMBINED HARROW AND PULVERIZER.

SPECIFICATION forming part of Letters Patent No. 377,223, dated January 31, 1888.

Application filed February 19, 1887. Serial No. 228,423. (No model.)

*To all whom it may concern:*

Be it known that I, GARRET P. ATCHISON, a citizen of the United States, residing at Chicago, in the county of Cook and State of Illinois, have invented certain new and useful Improvements in Combined Harrow and Pulverizer, (Sulky,) of which the following is a description.

My invention relates to such improvements in combined harrows and pulverizers that it can be easily lifted to be carried over any obstructions or carried from place to place, or be clear of the ground when not in use; and it also relates to such construction of the revolving harrow-wheel that its efficacy is greatly enhanced.

Figure 1:
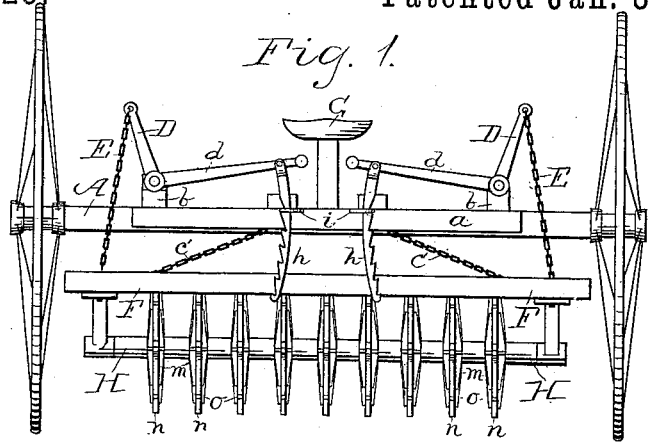
Figure 2:
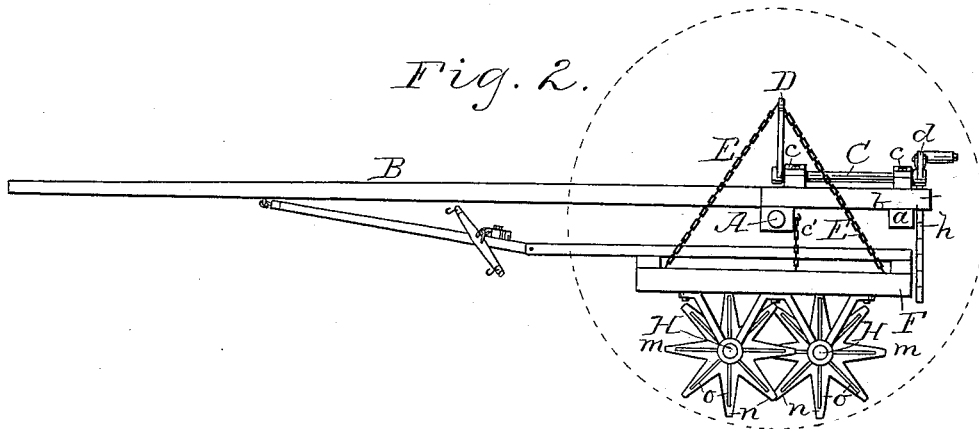
Figure 3:
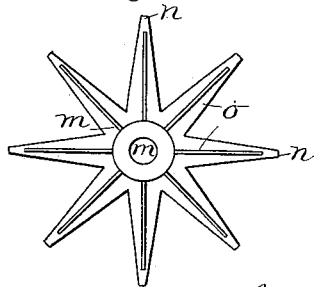

In the drawings, Figure 1 is a rear elevation of my invention. Fig. 2 is a side elevation thereof, and Fig. 3 is a side view of the revolving harrow-wheel.

Reference being had to the drawings, A represents an axle having suitable wheels journaled on its end spindles.

B represents the tongue, having its rear end divided longitudinally, and secured to the axle in such manner that the said bifurcations extend a couple of feet to the rear thereof, where they are secured to and support the cross-bar *a*. The ends of this cross-bar *a* are connected to the axle by the longitudinal side timbers, *b b*, thus forming at the rear of the axle a sort of rectangular frame. Near either end of the side timbers, *b b*, I place and secure in position the bearing *c c* for the oscillating shaft C. Secured to the rear ends of these shafts C are the levers *d d*, while at their forward ends (which terminate about over the axle A) are the arms D D, projecting from said shafts about at right angles to the levers *d*. The ends of arms D are provided with eyes or apertures through which the chain-bails E pass. The ends of these bails are secured to the ends of the side timbers of the rectangular frame F, which furnish bearings for two or more transverse series of rotary pulverizer and harrow wheels. Of course the weight of the pulverizer and harrow frame F would, unless some device was invented to prevent, oscillate shafts C C so as to bring arms D to a horizontal and levers *d d* to a vertical position. I provide for such a contingency, and thereby place the means for regulating the suspension of the harrow-frame F, &c., under full control of the operator by having the levers *d d* project in toward the transverse center of the machine, and provide their ends with lateral or other suitable handles, which can be easily manipulated by the operator, who sits in seat G, affixed on the end of a spring, *g*, secured to and projecting to the rear from the rear extension of tongue B, as shown. Near the free ends of these levers *d d* are pivoted the segmental pawls *h h*, which pass down through the guide-loops *i i*, secured to and projecting to the rear from the cross-bar *a*. The outer edges of the pawls *h h* are toothed or provided with serrations, so that if the rider desires to maintain either or both ends of frame F in a certain position he grasps the handle of lever *d*, and with his foot pushes the pawls inward. The weight of frame F immediately oscillates lever *d* upward, carrying pawl *h* with it, until in the position desired. The foot being withdrawn, one of the serrations of said pawl catches in the side of the loop and prevents further dropping of frame F.

I limit the lateral motion of frame F by means of the stay-chains *c c*, which connect the side timbers of said frame to the axle, as shown.

The side timbers of frame F are provided with bearings *f* depending from them, in which are secured the transverse stationary shafts H H. On these shafts are journaled series of alternating sleeves *k* and combined harrow and pulverizing spur-wheels *m*. The sleeves are placed between the spur-wheels to separate them, and each has an independent motion from the other and from its kind. These spur-wheels *m* have several projecting teeth, *n*, (preferably eight,) which taper as they approach their outer ends, and are provided with radial flanges or ribs, *o*, on either side, which commence at a point near their outer ends and run to and merge into their bosses. This construction greatly improves the pulverizing and crushing effect of the wheel, and this it accomplishes no matter how far the spur enters the earth.

I am aware of the existence of spur-wheels which have a slight projecting lug and an obliquely-projecting lug; but these wheels have to enter the ground just so far as to obtain the maximum benefits of their use, whereas in my invention it makes no difference how far the spur enters the earth so long as it does not cover the boss of the wheel. It works just as well with deep incision as with shallow.

What I claim as new is—

1. In a combination harrow and pulverizer, the tongue-axle A, rectangular frame consisting of side bars, b b, and rear cross-bar, a, shafts c, journaled in bearings on said side bars, arm D on the ends of said shafts over the axle, and bails E, leaves d on the rear end of the shafts C, projecting toward the rear end of the tongue, parts h h, pivotally secured to and depending from said levers, and staples or loops i i, secured to the cross-bar a, through which said panels pass and engage therewith, in combination with harrow-frame E, as set forth.

2. In a combination harrow and pulverizer, axle A, rectangular frame consisting of side bars, b b, and rear cross-bar, a, shafts C, journaled in the side timbers thereof, arms D, projecting, as described, from the forward ends of said shafts, and bails E, leaves d on the rear ends thereof, projecting in toward the longitudinal center of the machine, pawls h h, depending downward from near the ends of said levers, and loops i i, through which said pawls pass and with which they engage, in combination with the rectangular harrow-frame E, the transverse stationary shafts, independently-revolving spur-wheels m, and the sleeves k, placed between each spur-wheel.

GARRET P. ATCHISON.

Witnesses:
FRANK D. THOMASON,
JAMES H. COYNE.